United States Patent Office 3,420,623
Patented Jan. 7, 1969

3,420,623
MANUFACTURE OF PURIFIED AMMONIUM PHOSPHATES FROM WET PROCESS PHOSPHORIC ACID
James E. Barker, East Point, Ga., assignor to Tennessee Corporation, New York, N.Y., a corporation of Delaware
Filed June 1, 1967, Ser. No. 642,907
U.S. Cl. 23—106
Int. Cl. C01b 25/28
10 Claims

ABSTRACT OF THE DISCLOSURE

A process for producing commercially pure diammonium or monoammonium phosphate from impure phosphoric acid, preferably wet process phosphoric acid (WPA), wherein the impure acid is first reacted with an alkali metal salt or base to precipitate and subsequently separate the fluosilicates as the alkali metal salt. The treated acid is then neutralized with ammonia to precipitate the metallic phosphates out of solution. The metallic phosphates are separated out as a process by-product and the neutralized fluid is ammoniated with recycled aqueous ammonia to precipitate out the remaining metallic salts. The filtrate from the first stage ammoniation is then subjected to a second stage ammoniation at about a pressure of from atmospheric to about 60 p.s.i.g. but preferably 45 p.s.i.g. and a temperature from above 130° F., to decomposition temperature preferably 140° F. to obtain a heptammonium triphosphate $(NH_4)_7H_2(PO_4)_3$ precipitate which upon drying in an ammonia atmosphere converts at elevated temperature up to 300° F. preferably 180° F. to diammonium phosphate $(NH_4)_2HPO_4$. Alternatively, the heptammonium tri phosphate may be dried in an air atmosphere at temperatures from about 100° F. to 375° F. to obtain monoammonium phosphate.

Background of the invention

This invention relates to the production of ammonium phosphates and other salts from impure phosphoric acid, particularly wet process phosphoric acid (WPA) which is especially preferred and described herein in illustrating the invention. It is commercially desirable to utilize such wet process phosphoric acid (WPA) rather than the purer electric-furnace acid in the production of feed grade and technical grade diammonium phosphates. These upgraded phosphates are established commercial chemicals, and are used in animal feed supplements, liquid fertilizers, detergents and other uses.

Generally, wet process phosphoric acid is exceedingly impure for such uses. It is ordinarily prepared by the acidulation of phosphate rock and contains relatively large amounts of acid-soluble impurities present in such rock such as calcium sulfate, fluorides, and fluosilicates, salts of aluminum, magnesium, iron and other metals as well as suspended organic matter and carbon. These may vary for example from about 27 to 28% $P_2O_5$, 2.5 to 3.0% $SO_3$, 2 to 3% fluorine, 1.25 to 1.75% $Fe_2O_3$, 1.25 to 1.6% alumina, 0.25 to 0.4% calcium oxide, and from about 50 to 55% water, though the quantities set forth above are only illustrative and quite variable.

Thus, when an attempt is made to crystallize an ammonium phosphate such as diammonium phosphate directly from wet process acid, a precipitate forms containing fluosilicates, iron, aluminum, and calcium which may gell the entire solution and cause it to be extremely difficult to separate by filtration, centrifuging, decanting or other practical means. Various methods to upgrade the wet process phosphates have been tried. These include ion exchange, electrolysis, dialysis, pyrolysis, selective crystallizations, decolorization and solvent extraction. An example of a proposed method is shown in U.S. Patent No. 2,792,286 issued May 14, 1957 to J. D. Wordie et al. which shows a two stage ammoniation to a pH value of 4.0–4.2 during the first stage and a pH of about 6.3–6.7 at the second stage both at temperatures between 200° F. and 215° F. to obtain an aqueous ammonium phosphate suitable as a fertilizer, but not having a sufficient purity to qualify as a feed grade or technical grade ammonium phosphate.

Summary of the invention

I have discovered that a satisfactorily pure ammonium phosphate can be produced from primary wet process phosphoric acid by first precipitating fluorine with an alkali metal salt or hydroxide as the alkali metal fluosilicate and clarifying the acid by sedimentation. The clarified acid is then neutralized with ammonia to a pH from about 3.5 to 6.0, thereby precipitating the metal phosphates out of solution and subsequently separating them by filtration. The neutralized filtrate is then ammoniated in two stages. The neutralized filtrate is ammoniated in the first stage to a pH above 6, preferably about 9 to precipitate the remaining metal phosphates out of solution, which are separated by filtration. The ammoniated filtrate is then ammoniated in a second stage ammoniation at a pressure of from atmospheric to 60 p.s.i.g. and at a temperature from above 130° F., to the decomposition temperature, the preferred pressure and temperature being 45 p.s.i.g. and 140° F. respectively, to precipitate the phosphate as heptammonium phosphate, $(NH_4)_7H_2(PO_4)_3$, which is separated, dried and converted to mono- or diammonium phosphate. Monoammonium phosphate $(NH_4)H_2PO_4$ is obtained from the heptammonium phosphate by drying it in an air atmosphere at a temperature of from about 100° F. to 375° F. depending upon time. Diammonium phosphate is obtained from the heptammonium phosphate by drying it in an ammonia atmosphere at temperatures of from about 180° F. to about 270° F., the higher temperatures requiring high ammonia atmospheric pressures.

Accordingly, an object of this invention is the production of commercially pure diammonium phosphate from wet process phosphoric acid.

Another object of this invention is a process for the production of commercially pure diammonium phosphate, and various useful by-products from wet process phosphoric acid.

A further object of this invention is the production of metal phosphate salts suitable for inclusion in fertilizers and the like from wet process phosphoric acid.

Still another object of this invention is the production of monoammonium phosphate from wet process phosphoric acid.

Other objects and advantages of the process of this invention will be apparent and obvious from the description of the preferred embodiments and drawings which follow.

Brief description of the drawings

With reference to the preferred embodiments of this invention the following drawings are included wherein.

Description of the preferred embodiment

Figure 1:
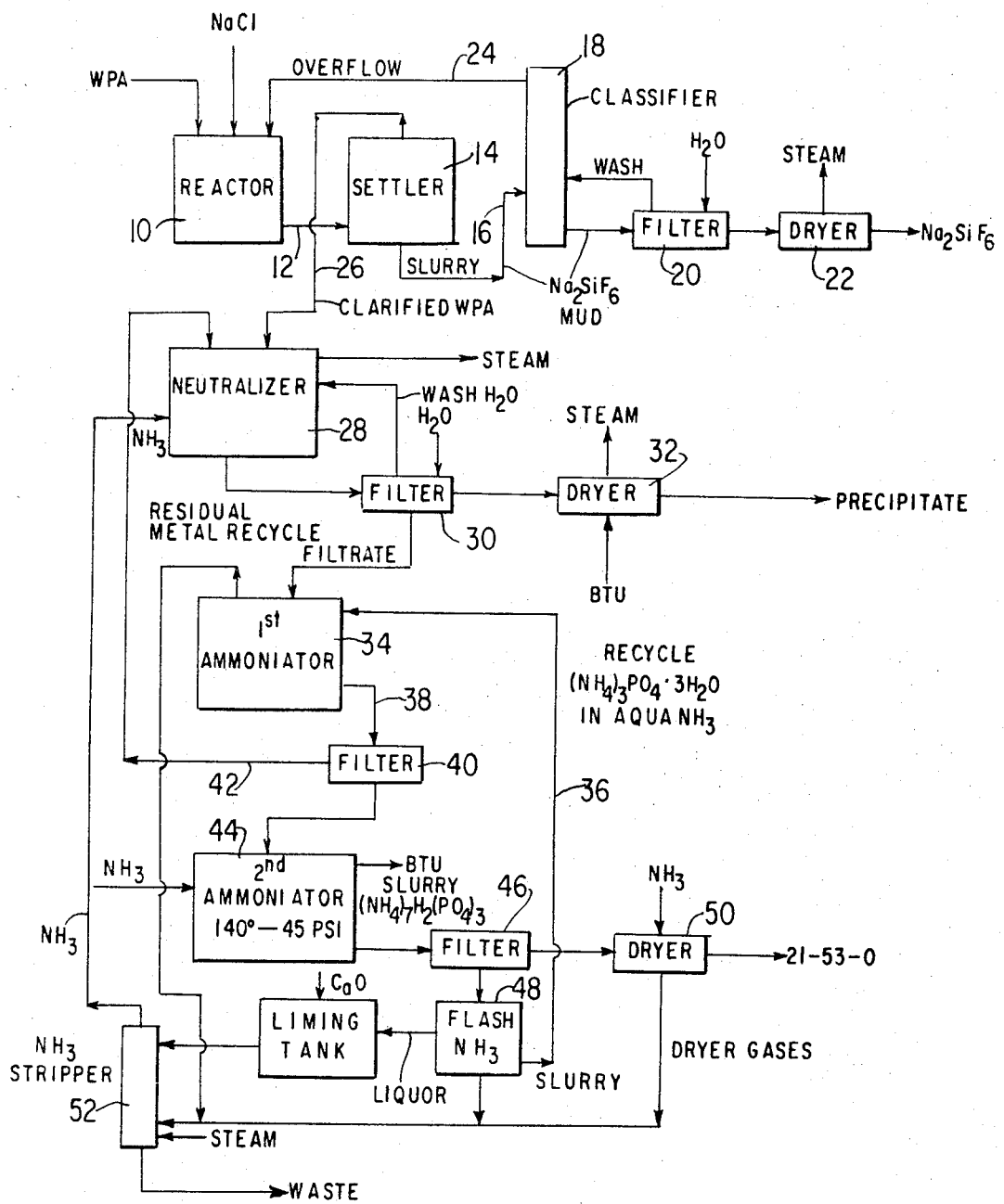
FIGURE 1 is a flow diagram of the process of this invention.

With reference to FIGURE 1 of the drawings, a flow diagram of the process of this invention is shown wherein wet process phosphoric acid (WPA) containing various impurities as described above is passed into a reactor 10 from a source not shown. Alkali metal salts or hydroxides such as potassium hydroxide, sodium carbonate but preferably salt (NaCl), in an amount sufficient to react with the fluosilicates in the wet process phosphoric acid also are fed into the reactor 10 from a source not shown. The reaction product is the corresponding salt, e.g. sodium fluosilicate ($Na_2SiF_6$), precipitate, which is separated from the phosphoric acid stream by feeding the phosphoric acid, and alkali metal fluosilicate mixture through path 12 to a settler 14 where the alkali metal fluosilicate is separated as a slurry and passed by way of path 16 to a classifier 18 where it is washed. Other conventional separating means such as filter 20 and dryer 22 may be used. Overflow from the classifier 18 is recycled back with the reactor 10 by way of path 24.

The clarified wet process phosphoric acid is removed from the settler 14 by way of path 26 to a neutralizer 28 where it is contacted with ammonia, or aqueous ammonia or a combination of such streams in order to neutralize the phosphoric acid to a pH of from about 3.5 to about 6.0 while the heat of neutralization is removed as steam. Preferably the clarified phosphoric acid is neutralized to a pH of about 5.5 which precipitates a major portion of the metal phosphates.

The neutralized stream containing metal phosphates which have precipitated out of solution is then filtered as at filter 30 to remove the precipitated metal phosphates which are in turn passed to a dryer 32 and removed as a solid useful by-product herein described as a 6-46-0 fertilizer product thereby specifying the ratio by weight of the available nitrogen-phosphorous-potassium to the whole composition.

This 6-46-0 by-product contains the metal impurities present in the phosphoric acid. It is a tan powder composed of agglomerates of fine particles. The discrete particles are about 1.5 microns in size while the conglomerates are 40–160 microns. Studies show that this by-product may be used as a fertilizer ingredient or soil conditioning agent.

The filtrate from the neutralizing reaction is preferably ammoniated in two stages to improve the filter rate of the slurry resulting from the second stage ammoniation and to remove any metal phosphates remaining during the first stage. However, there is no reason why the filtrate cannot be ammoniated in a single step or stage although it is economically and industrially efficient to use a two-step ammoniation where the first stage ammoniator 34 receives the filtrate from the filter 30 and recycled triammonium phosphate trihydrate (($NH_4)_3PO_4 \cdot 3H_2O$) in aqueous ammonia from the final filtration through path 36.

The first stage ammoniation utilizes recycled tri ammonium phosphate trihydrate in aqueous ammonia as the ammoniating reactant. The pH obtained in the first stage ammoniator 34 can be from about 7.0 upwards though a pH of about 9 is preferred. During this step remaining impurities are precipitated out of solution.

The effect of the first step ammoniation in ammoniator 34 is to precipitate residual metal phosphates and silica. They are removed from the first stage ammoniation stream shown at 38 by centrifuging or other filtering means at filter 40 and recycled by way of path 42 to the neutralizer 28.

The neutralized liquor filtrate from the first stage ammoniator is then passed into the second stage ammoniator 44 and ammoniated under conditions of pressure and temperature so as to precipitate heptammonium triphosphate (($NH_4)_7H_2(PO_4)_3$). These conditions are a pressure in an ammonia atmosphere of from atmospheric to about 60 p.s.i.g. and a temperature of from slightly more than 130° F. upwards, where higher temperatures require higher pressures. As anhydrous heptammonium triphosphate has a transition temperature to triammonium phosphate trihydrate of about 130° F., the second stage ammoniation temperature must be above this transition temperature. Preferably a temperature of about 140° F. is used in conjunction with a pressure of 45 p.s.i.g. to achieve satisfactory results. This second stage ammoniation reaction is exothermic and is cooled to prevent excessive pressure and loss of phosphates. Maintenance of the second stage ammoniation step at 140° F. retains the heptammonium triphosphate (($NH_4)_7H_2(PO_4)_3$) as a stable precipitate. The heptammonium triphosphate slurry resulting from the second stage ammoniation is passed to a filter 46 where it is washed with aqueous ammonia under pressure and at elevated temperature to prevent hydration.

The second stage ammoniation filtrate is fed to a surge tank 48 where it is returned to atmospheric pressure, and ammonia is flashed off cooling the filtrate to below 100° F. to preferably about 93° F. Most of the residual phosphate crystallizes out of solution as triammonium phosphate trihydrate, ($NH_4)_3PO_4 \cdot 3H_2O$, which is recycled along with aqueous ammonia by way of path 36 to the first stage ammoniator 34.

The wet heptammonium triphosphate

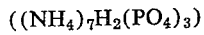

filtered precipitate is passed to dryer 50 where it is dried in an ammonia atmosphere at an elevated temperature up to about 300° F., preferably about 180° F., to remove adsorbed liquor and to convert it to diammonium phosphate ($NH_4)_2HPO_4$. (In the absence of an ammonia atmosphere, the diammonium phosphate will decompose at 160° F.) Alternatively, if it is desired to produce monoammonium phosphate, the wet heptaammonium tri phosphate filtered precipitate is passed to the dryer 50, where it is dried in an air atmosphere at elevated temperatures of up to about 375° F., a higher drying temperature requiring less drying time.

In the process as shown in FIGURE 1 all the ammonia vapor drawn off the first stage ammoniation, the surge tank and the second stage ammoniator-dryer is returned to the process by recovery in an ammonia stripper 52. Ammonia is recycled from the stripper 52 to the neutralizer 28, and the second stage ammoniator 44.

In another embodiment of the invention, the phosphoric acid may be neutralized with ammonia without preliminary separation of fluosilicates. In this instance, the fluosilicates are precipitated along with the metallic impurities during the neutralization operation. This embodiment may be employed in those instances in which the separate recovery of fluosilicates is not desired.

Figure 2:
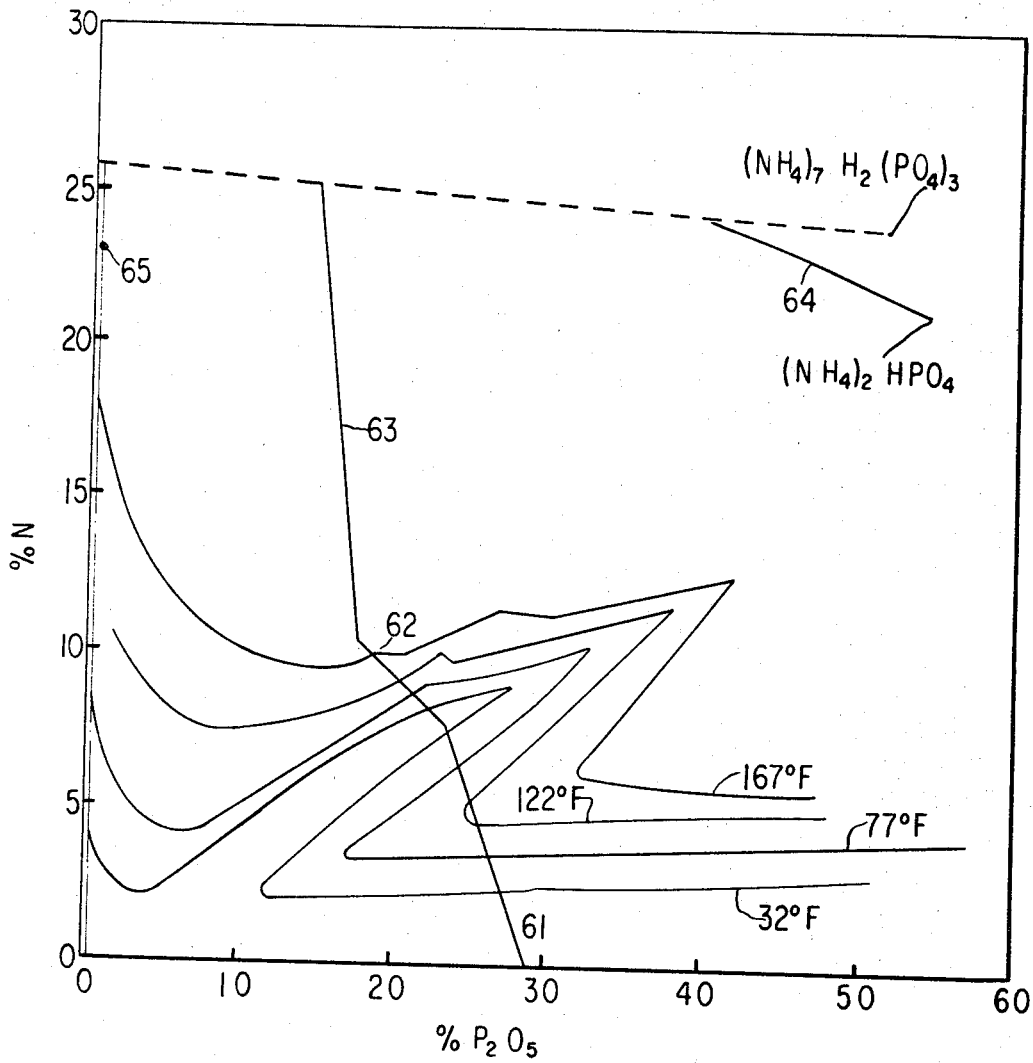
FIGURE 2 is a graphical representation of the solubility relationships in the $NH_3$-$P_2O_5$-$H_2O$ system indicating steps of the process.

Referring to FIGURE 2 of the drawings, the various steps of the process described above are shown in relation to a solubility diagram of the $NH_3$-$H_3PO_4$-$H_2O$ system at various temperatures.

The abscissa of the graph of FIGURE 2 is the phosphorus expressed as percent by weight $P_2O_5$ while the ordinate is the ammonium expressed as percent by weight nitrogen. Line 61 of the solubility system diagram represents the step of neutralizing the clarified phosphoric acid with ammonia to precipitate the metal phosphates. The step of mixing the filtrate of the neutralized phosphoric acid with recycle aqueous ammonia at the first stage ammoniator is represented by line 62 of FIGURE 2. As mentioned this preammoniation improves the filter rate of the heptammonium triphosphate

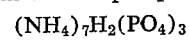

precipitated in the second stage ammoniation.

The neutralized phosphate solution is then fed into the second stage ammoniator 44 and ammoniated under a pressure of about 45 p.s.i.g. at a temperature of about 140° F. This step precipitates the phosphate as the anhydrous heptammonium triphosphate salt and is shown by line 63. The composition of the two phases is represented by the extremities of the dashed line. On drying in an ammonia atmosphere in the dryer 50, the heptammonium triphosphate salt loses ammonia thereby forming diammonium phosphate, which step is indicated by line 64 of FIGURE 2.

Lime is added to the ammoniacal liquor filtrate of the second stage ammoniation as at a liming tank 54. The ammonia released by the lime is then volatilized by steam in the stripper 52, and returned to the process. The stripped liquor is then discharged as waste.

Having described the process of this invention, the following example is presented by way of illustration rather than limitation.

Example 4220 lbs. of wet process phosphoric acid (primary acid) composed essentially of 40% $H_3PO_4$, 52% water, 2.6% fluorine and traces of other ingredients was mixed with 103 lbs. of salt (NaCl) with the reaction temperature maintained at 140° F. The sodium fluosilicate ($Na_2SiF_6$) precipitate was recovered by sedimentation, water classified, washed and dried, resulting in 154 lbs. of by-product.

The clarified primary acid consisting essentially of 38% by weight $H_3PO_4$ and 54.9% water was fed to the neutralizer simultaneously with ammonia and the pH in the neutralizer was controlled at 5.5. The temperature in the neutralizer was maintained at about 217° F. by the vaporization of included water as steam. An open wall spray column (not shown) was used to recover ammonia from the steam. The resulting neutralized slurry was filtered, and the filter cake washed and dried. This by-product described as fertilizer grade 6-46-0 analyzed as follows:

| | Percent |
|---|---|
| $P_2O_5$ | 46.3 |
| $NH_3$ | 7.4 |
| Fe | 9.4 |
| Al | 9.8 |
| Ca | 2.29 |
| Mg | 1.24 |
| Si | 2.62 |
| F | 4.85 |

The neutralized filtrate was ammoniated with aqueous ammonia at a pH of about 9, a temperature of about 170° F. and atmospheric pressure, and centrifuged to remove the precipitated materials which were recycled to the neutralizer. The first stage ammoniated filtrate was subjected to the second stage ammoniation by anhydrous ammonia at 140° F. and 45 p.s.i.g. where the first stage filtrate was pumped into the ammoniator 44 at a pre-set rate and ammonia was fed through a sparger (not shown), while liquid level was continually monitored and controlled by means (not shown) such as electrical conductors set at various levels in the ammoniator 44 to indicate level by utilizing the reaction fluid as an electrolyte. Slurry was discharged periodically to maintain the desired reactor level. The slurry was then filtered and the solid heptammonium triphosphate recovered being dried at 180° F. in an ammonia atmosphere having a pressure of 33 millimeters Hg, converting it to diammonium phosphate $(NH_4)_2HPO_4$ and removing any adsorbed liquor. It was found to be approximately 99.1% diammonium phosphate.

Having thus fully described the process of this invention and desiring to cover all matter within the spirit and scope of the invention,

I claim:

1. A process for the production of purified ammonium phosphates from impure phosphoric acid having various metallic and other impurities such as fluosilicates comprising:

(a) neutralizing the phosphoric acid with ammonia to precipitate the metallic impurities as metallic phosphate;
   (b) separating the metallic phosphate precipitate from the neutralized phosphoric acid;
   (c) ammoniating the neutralized phosphoric acid at a pressure of from atmospheric to 60 p.s.i.g. and a temperature from over 130° F. to below the decomposition temperature to obtain a heptammonium triphosphate $[(NH_4)_7H_2(PO_4)_3]$ precipitate;
   (d) separating the heptammonium triphosphate precipitate; and
   (e) drying the heptammonium triphosphate precipitate at elevated temperatures to produce the purified ammonium phosphates.

2. The process of claim 1 which additionally comprises:

(a) ammoniating the neutralized phosphoric acid in a first stage ammoniation to additionally precipitate insoluble salts remaining in the neutralized phosphoric acid; and
   (b) removing the insoluble salts to obtain a first stage ammoniated phosphate solution.

3. The process of claim 1 wherein the step of neutralizing the phosphoric acid with ammonia comprises:

(a) maintaining the pH of the neutralized phosphoric acid from 3.5 to about 6.
   (b) and removing the heat of neutralization.

4. The process of claim 1 which additionally comprises:

(a) reacting the impure phosphoric acid with an alkali metal base reactant selected from the group consisting of alkali metal hydroxides, alkali metal carbonates and alkali metal chlorides to obtain an alkali metal fluosilicate precipitate; and
   (b) separating the alkali metal fluosilicate precipitate from the phosphoric acid.

5. The process of claim 4 which additionally comprises:

(a) ammoniating the neutralized phosphoric acid in a first stage ammoniation to additionally precipitate insoluble salts remaining in the neutralized phosphoric acid; and
   (b) removing the insoluble salts to obtain a first stage ammoniated phosphate filtrate.

6. The process of claim 5 wherein the step of ammoniating the phosphoric acid under conditions of temperature and pressure to obtain heptammonium triphosphate comprises:

(a) mixing the first stage ammoniated phosphate filtrate with anhydrous ammonia at a pressure of about 45 p.s.i.g. and a temperature of about 140° F. in order to obtain a precipitated stable heptammonium triphosphate slurry; and
   (b) separating the heptammonium triphosphate precipitate from the slurry thereby obtaining a purified heptammonium phosphate and ammoniated liquor.

7. The process of claim 6 wherein the step of drying the heptammonium triphosphate precipitate comprises:
   heating the heptammonium triphospate at elevated temperatures of up to 300° F. in an ammonia atmosphere to obtain diammonium phosphate, $$[(NH_4)_2HPO_4]$$

8. The process of claim 6 wherein the step of drying the heptammonium triphosphate precipitate comprises:
   heating the heptammonium triphosphate at elevated temperatures up to 375° F. in an air atmosphere for a sufficient period to obtain monoammonium phosphate.

9. The process of claim 7 wherein:

(a) the alkali metal base reactant is salt (NaCl);
(b) the neutralization is carried out to a pH of about 5.5;
(c) the first stage ammoniation is carried out to a pH of about 9; and
(d) the temperatures for drying the heptammonium triphosphate is 180° F.

10. The process of claim 9 wherein:
the heat of neutralization is removed by vaporization of water in the phosphoric acid to steam.

References Cited

UNITED STATES PATENTS

| | | | |
|---|---|---|---|
| 2,792,286 | 5/1957 | Wordie et al. | 23—107 |
| 3,107,145 | 10/1963 | Hinkle et al. | 23—108 |

EARL C. THOMAS, *Primary Examiner.*

L. A. MARSH, *Assistant Examiner.*